US012665217B2

(12) United States Patent
Kim et al.

(10) Patent No.: US 12,665,217 B2
(45) Date of Patent: **\*Jun. 23, 2026**

(54) RECHARGEABLE METAL HALIDE BATTERY

(71) Applicant: International Business Machines Corporation, Armonk, NY (US)

(72) Inventors: Jangwoo Kim, San Jose, CA (US); Young-hye Na, San Jose, CA (US); Gregory Breyta, San Jose, CA (US)

(73) Assignee: International Business Machines Corporation, Armonk, NY (US)

( \* ) Notice: Subject to any disclaimer, the term of this patent is extended or adjusted under 35 U.S.C. 154(b) by 0 days.

This patent is subject to a terminal disclaimer.

(21) Appl. No.: 17/463,909

(22) Filed: Sep. 1, 2021

(65) Prior Publication Data

US 2021/0399332 A1 Dec. 23, 2021

Related U.S. Application Data

(62) Division of application No. 16/297,369, filed on Mar. 8, 2019, now Pat. No. 11,165,093.

(51) Int. Cl.

| | |
|---|---|
| *H01M 10/052* | (2010.01) |
| *H01M 4/38* | (2006.01) |
| *H01M 10/0525* | (2010.01) |
| *H01M 10/0569* | (2010.01) |
| *H01M 10/058* | (2010.01) |

(52) U.S. Cl.
CPC ....... *H01M 10/0525* (2013.01); *H01M 4/382* (2013.01); *H01M 4/388* (2013.01); *H01M 10/0569* (2013.01); *H01M 10/058* (2013.01)

(58) Field of Classification Search
CPC ............. H01M 10/052; H01M 10/054; H01M 10/0525; H01M 10/0561; H01M 10/0563; H01M 10/0569; H01M 10/058; H01M 10/36; H01M 10/38; H01M 10/399; H01M 4/382; H01M 4/381; H01M 4/388
See application file for complete search history.

(56) References Cited

U.S. PATENT DOCUMENTS

| | | | |
|---|---|---|---|
| 3,540,934 A | 11/1970 | Jan | |
| 3,793,079 A | 2/1974 | Brown et al. | |
| 3,994,745 A | 11/1976 | Ludwig | |
| 4,020,246 A | 4/1977 | Seo | |
| 4,296,185 A | 10/1981 | Catanzarite | |
| 4,513,067 A | 4/1985 | Kuo et al. | |
| 5,510,209 A | 4/1996 | Abraham | |
| 6,946,215 B2 | 9/2005 | Roy et al. | |
| 7,718,319 B2 | 5/2010 | Manthiram et al. | |
| 7,846,588 B2 | 12/2010 | Jung et al. | |
| 8,148,011 B2 | 4/2012 | Thackeray et al. | |
| 8,277,683 B2 | 10/2012 | Deng et al. | |
| 8,465,877 B2 | 6/2013 | Hase et al. | |
| 8,663,849 B2 | 3/2014 | Venkatachalam et al. | |
| 8,673,505 B2 | 3/2014 | Ohzuku et al. | |
| 9,196,901 B2 | 11/2015 | Se-Hee et al. | |
| 9,437,902 B2 | 9/2016 | Onizuka | |
| 9,461,349 B2 | 10/2016 | Mizuno et al. | |
| 9,537,179 B2 | 1/2017 | Bhavaraju et al. | |
| 9,755,270 B2 | 9/2017 | Kim et al. | |
| 9,806,380 B2 | 10/2017 | Kumar et al. | |
| 9,893,383 B2 | 2/2018 | Raub et al. | |
| 9,911,981 B1 | 3/2018 | Kane | |
| 9,991,981 B2 | 6/2018 | Bunte | |
| 11,165,093 B2 * | 11/2021 | Kim ...................... | H01M 4/382 |
| 11,316,199 B2 * | 4/2022 | Kim ................. | H01M 10/0568 |
| 11,329,320 B2 | 5/2022 | Kubo | |
| 11,335,908 B2 | 5/2022 | Kim et al. | |
| 2002/0122973 A1 | 9/2002 | Manev et al. | |
| 2003/0157409 A1 | 8/2003 | Huang | |
| 2004/0009390 A1 | 1/2004 | Roy | |
| 2006/0003232 A1 | 1/2006 | Jung et al. | |
| 2008/0226977 A1 | 9/2008 | Kim et al. | |
| 2009/0053594 A1 | 2/2009 | Johnson et al. | |
| 2009/0061315 A1 | 3/2009 | Nakano et al. | |
| 2009/0311567 A1 | 12/2009 | Msco | |
| 2010/0273066 A1 * | 10/2010 | Flanagan .............. | H01M 12/08 429/324 |

(Continued)

FOREIGN PATENT DOCUMENTS

| | | |
|---|---|---|
| CN | 1358337 A | 7/2002 |
| CN | 1612383 A | 5/2005 |

(Continued)

OTHER PUBLICATIONS

IBM: List of Pateants or Patent Applications Treated as Related, Aug. 31, 2021, pp. 1-2.
International Search Report and Written Opinion for the counterpart PCT, PCT/IB2020/051752, dated May 28, 2020.
Office Actions and responses filed in IBM related patent application, U.S. Appl. No. 15/872,607.
United States Advisory Action dated Apr. 14, 2023, 3 pages, in U.S. Appl. No. 16/927,815.
United States Advisory Action dated Aug. 13, 2024, 3 pages, in U.S. Appl. No. 16/927,815.
United States Advisory Action dated Oct. 12, 2023, 3 pages, in U.S. Appl. No. 16/927,815.

(Continued)

*Primary Examiner* — Raymond Alejandro
(74) *Attorney, Agent, or Firm* — Aaron N. Pontikos

(57) ABSTRACT

Provided is a rechargeable metal halide battery with an anode; an electrolyte including (i) an oxidizing gas, (ii) a metal halide, and (iii) a heterocyclic compound solvent; and a current collector contacting the active cathode material. As the metal halide of the electrolyte acts as an active cathode material that can receive, store, and release metal ions during charging and discharging of the battery, the battery does not require a dedicated cathode. The lack of a dedicated cathode results in a rechargeable battery with high power density that is lightweight and inexpensive to make.

12 Claims, 7 Drawing Sheets

(56) References Cited

U.S. PATENT DOCUMENTS

| | | | |
|---|---|---|---|
| 2012/0270116 A1 | 10/2012 | Cho | |
| 2012/0321911 A1 | 12/2012 | Watanabe et al. | |
| 2013/0069601 A1 | 3/2013 | Coowar et al. | |
| 2013/0089795 A1 | 4/2013 | Chase | |
| 2013/0130131 A1 | 5/2013 | Johnson | |
| 2013/0137001 A1 | 5/2013 | Zhang et al. | |
| 2013/0224535 A1 | 8/2013 | Matsuoka et al. | |
| 2013/0280624 A1 | 10/2013 | Lohmann | |
| 2014/0030596 A1* | 1/2014 | Wu | H01M 4/75 |
| | | | 420/580 |
| 2014/0065456 A1 | 3/2014 | Bhavaraju et al. | |
| 2014/0138591 A1 | 5/2014 | Yoon et al. | |
| 2014/0234701 A1 | 8/2014 | Tanaka et al. | |
| 2014/0255802 A1 | 9/2014 | Barde | |
| 2014/0322597 A1 | 10/2014 | Zhang et al. | |
| 2014/0329151 A1 | 11/2014 | Onizuka et al. | |
| 2015/0147673 A1 | 5/2015 | Li et al. | |
| 2015/0236343 A1 | 8/2015 | Xiao et al. | |
| 2015/0263379 A1 | 9/2015 | Xiao et al. | |
| 2015/0280296 A1 | 10/2015 | Kang et al. | |
| 2015/0325882 A1 | 11/2015 | Yushin et al. | |
| 2015/0325883 A1 | 11/2015 | Matsui et al. | |
| 2016/0248115 A1 | 8/2016 | Hatta et al. | |
| 2016/0315345 A1 | 10/2016 | Kim | |
| 2017/0033350 A1 | 2/2017 | Mizuno et al. | |
| 2017/0033359 A1 | 2/2017 | Ogumi et al. | |
| 2017/0179557 A1 | 6/2017 | Sun et al. | |
| 2017/0194668 A1 | 7/2017 | Park | |
| 2017/0207475 A1 | 7/2017 | Ito | |
| 2017/0222290 A1 | 8/2017 | Kang | |
| 2017/0250404 A1 | 8/2017 | Cho | |
| 2017/0352936 A1 | 12/2017 | Jin | |
| 2019/0221887 A1* | 7/2019 | Kim | H01M 4/38 |
| 2020/0161709 A1 | 5/2020 | Kubo et al. | |
| 2020/0251775 A1 | 8/2020 | Kovacs et al. | |
| 2021/0036323 A1 | 2/2021 | Kim et al. | |
| 2021/0257702 A1 | 8/2021 | Sugimori et al. | |
| 2022/0013778 A1 | 1/2022 | Kim et al. | |
| 2022/0200052 A1 | 6/2022 | Kim et al. | |
| 2022/0231295 A1 | 7/2022 | Kim et al. | |

FOREIGN PATENT DOCUMENTS

| | | | |
|---|---|---|---|
| CN | 101267046 A | 9/2008 | |
| CN | 101567472 A | 10/2009 | |
| CN | 104916810 A | 9/2015 | |
| CN | 105849967 A | 8/2016 | |
| CN | 106207264 A | 12/2016 | |
| CN | 106207191 B | 2/2019 | |
| CN | 105579125 B | 4/2019 | |
| CN | 109950550 A | 6/2019 | |
| CN | 111600020 A | 8/2020 | |
| CN | 113508480 A | 10/2021 | |
| CN | 114175316 A | 3/2022 | |
| CN | 116134641 A | 5/2023 | |
| CN | 111602277 B | 8/2023 | |
| DE | 112020001130 T5 | 12/2021 | |
| DE | 112020002995 T5 | 3/2022 | |
| DE | 112021003738 T5 | 4/2023 | |
| EP | 3740987 A1 | 11/2020 | |
| GB | 2600621 A | 5/2022 | |
| GB | 2612510 A | 5/2023 | |
| GB | 2596465 B | 9/2023 | |
| IN | 496832 B | 1/2024 | |
| JP | 6037661 B2 | 8/1985 | |
| JP | 60146464 A | 8/1985 | |
| JP | 6110882 A | 1/1986 | |
| JP | 02114464 A | 4/1990 | |
| JP | H0211446 A | 4/1990 | |
| JP | 06293991 A | 10/1994 | |
| JP | 1064540 A | 3/1998 | |
| JP | 2004-303437 A | 10/2004 | |
| JP | 2006-019274 A | 1/2006 | |
| JP | 2007273405 A | 10/2007 | |

| | | | |
|---|---|---|---|
| JP | 2009064584 A | 3/2009 | |
| JP | 2009170400 A | 7/2009 | |
| JP | 2010-170867 A | 8/2010 | |
| JP | 2011222473 A | 11/2011 | |
| JP | 2012-527740 A | 11/2012 | |
| JP | 2013-084547 A | 5/2013 | |
| JP | 2014-011105 A | 1/2014 | |
| JP | 5668913 B2 | 2/2015 | |
| JP | 2015-099849 A | 5/2015 | |
| JP | 2016540358 A | 12/2016 | |
| JP | 2017514278 A | 6/2017 | |
| JP | 2018525779 A | 9/2018 | |
| JP | 2020537780 A | 12/2020 | |
| JP | 2021-510904 A | 4/2021 | |
| JP | 2022522657 A | 4/2022 | |
| JP | 2022-542235 A | 9/2022 | |
| JP | 7216734 B2 | 2/2023 | |
| JP | 2023-534217 A | 8/2023 | |
| KR | 2020-0078551 A | 6/2022 | |
| KR | 102405976 B1 | 6/2022 | |
| KR | 10-2023-0031887 A | 3/2023 | |
| WO | 2010/005686 A2 | 1/2010 | |
| WO | 2011/154692 A1 | 12/2011 | |
| WO | 2015/088065 A1 | 6/2015 | |
| WO | 2016014630 A1 | 1/2016 | |
| WO | 2017013379 A1 | 1/2017 | |
| WO | 2017149204 A2 | 9/2017 | |
| WO | 2018225434 A1 | 12/2018 | |
| WO | 2019/142060 A1 | 7/2019 | |
| WO | 2020/018731 A1 | 1/2020 | |
| WO | 2020183282 A1 | 9/2020 | |
| WO | 2021/019320 A1 | 2/2021 | |
| WO | 2022/013634 A1 | 1/2022 | |

OTHER PUBLICATIONS

United States Final Rejection dated Aug. 16, 2023, 13 pages, in U.S. Appl. No. 16/927,815.

United States Final Rejection dated Feb. 6, 2023, 9 pages, in U.S. Appl. No. 16/927,815.

United States Final Rejection dated Jun. 6, 2024, 13 pages, in U.S. Appl. No. 16/927,815.

United States Non-Final Rejection dated Feb. 21, 2024, 13 pages, in U.S. Appl. No. 16/927,815.

United States Non-Final Rejection dated May 16, 2023, 14 pages, in U.S. Appl. No. 16/927,815.

United States Non-Final Rejection dated Nov. 9, 2023, 11 pages, in U.S. Appl. No. 16/927,815.

United States Non-Final Rejection dated Oct. 25, 2022, 10 pages, in U.S. Appl. No. 16/927,815.

United States Notice of Allowance dated Aug. 21, 2024, 8 pages, in U.S. Appl. No. 17/693,352.

United States Requirement for Restriction/Election dated Jul. 18, 2022, 6 pages, in U.S. Appl. No. 16/927,815.

United States Requirement for Restriction/Election dated May 10, 2022, 14 pages, in U.S. Appl. No. 16/927,815.

The State Intellectual Property Office of People's Republic of China, "Notification to Grant", Jul. 15, 2024, 4 pages, CN Application No. 202080018029.6.

International Search Report and Written Opinion dated May 28, 2020 from International Application No. PCT/IB2020/051752 filed Mar. 20, 2020.

First Chinese Office Action from Chinese Application No. 201980008474.1 filed Jan. 7, 2019.

GB Examination Report dated Sep. 8, 2022 from GB Application No. GB2113517.3 filed Mar. 2, 2020.

International Search Report and Written Opinion dated Apr. 17, 2019 from International Application No. PCT/IB2019/050094 filed Jan. 7, 2019.

Korean Office Action dated Feb. 24, 2022 from Korean Patent No. KR2405976 granted May 31, 2022.

Li et al., "Li-02 Cell with LiI(3-hydroxypropionitrile)2 as a Redox Mediator: Insight into the Working Mechanism of I-During Charge in Anhydrous Systems", The Journal of Physical Chemistry Letters 8:42184225 (2017).

(56) References Cited

OTHER PUBLICATIONS

Liu et al., Cycling Li-02 batteries via LiOH formation and decomposition, Science 350(6260):530-533 (2015).

Notice of Reasons for Refusal dated Jul. 18, 2023 from JP Application No. JP2021549404 dated Mar. 20, 2020.

Notice of Reasons for Refusal dated May 12, 2022 from Japanese Application No. JP2020537780 filed Jan. 7, 2019.

Olsen et al., Dissolution of platinum in methoxy propionitrile containing Li1/12, Solar Energy Materials & Solar Cells 3967-273 (2000).

Perathoner, et al., "Advanced Nanocarbon Materials for Future Energy Applications", Emerging Materials for Energy Conversions and Storage, Chapter 91, pp. 305-3297 Elsevier, Inc., 2018.

Second Chinese Office Action dated Mar. 14, 2023 from Chinese Application No. 201980008474.1 filed Jan. 7, 2019.

Supplementary European Search Report dated Mar. 12, 2021 from EP Application No. 19741572 filed Jan. 7, 20019.

Sygkridou et al., "Functional transparent quasi-solid state dye-sensitized solar cells made with different oligomer organic/inorganic hybrid electrolytes", Solar Energy Materials & Solar Cells 159:600-607 (2017).

Zhao et al., "High-performance rechargeable lithium-iodine batteries using triiodide/iodide redox couples in an aqueous cathode", Nature Communications pp. 1-7, 4:1896; DOI: 10.1038/ncomms2907; www.nature.com/naturecommunications) (2013).

Zhao et al.,"A 3.5 V Lithium-Iodine Hybrid Redox Battery with Vertically Aligned Carbon Nanotube Current Collector", Nano Letters 14:1085-1092 (2014).

Zhu et al., "Proton enhanced dynamic battery chemistry for aprotic lithium-oxygen batteries", Nature Communications p. 1-8, 8:14308; DOI: 10.1038/ncomms14308; www-nature.com/naturecommunications) (2017).

Bruce et al., Li—O2 and Li—S Batteries with High Energy Storage, Nat. Mater 11, Dec. 15, 2011, 19-29 pp.

Bryantsev et al., The Identification of Stable Solvents for Nonaqueous Rechargeable Li-Air Batteries, Journal of the Electrochemical Society, Nov. 21, 2012, vol. 160, Issue 1, A160-A171 pp.

Cabana et al., Beyond Intercalation-Based Li-Ion Batteries: The State of the Art and Challenges of Electrode Materials Reacting Through Conversion Reactions, Advanced Energy Materials, Aug. 20, 2010, E170-E192 pp.

Etacheri et al., Challenges in the development of advanced Li-ion batteries: a review, Energy & Environmental Science, Jan. 2011, vol. 4, 3243-3262 pp.

Girishkumar et al., "Lithium-Air Battery: Promise and Challenges", The Journal of Physical Chemistry Letters, Jul. 2, 2010, vol. 1, Issue 14, 2193-2203 pp.

Goriparti et al., Review on recent progress of nanostructured anode materials for Li-ion batteries, Journal of Power Sources 257:421-443 (2014).

Heller et al., Potentially Implantable Miniature Batteries, Annals of Bioanalytical Chemistry, Mar. 15, 2006, vol. 385, 469-473 pp.

Indian Patent Office, "First Indian Examination Report", Apr. 13, 2023, 8 pages, Indian Application No. 202347002018.

Intellectual Property Office, Patents Act 1977: Search Report under Section 18(3), Jul. 9, 2024, 3 Pages, GB Application No. 2301706.4.

International Searching Authority, "Notification of Transmittal of the International Search Report and the Written Opinion of the International Searching Authority," Patent Cooperation Treaty, May 20, 2021, 8 pages, International Application No. PCT/IB2021/054363.

Karden et al., Energy storage devices for future hybrid electric vehicles, Journal of Power Sources, May 25, 2007, vol. 168, Issue 1, 2-11 pp.

Kim et al., Reduced Graphene Oxide/Lil Composite Lithium Ion Battery Cathodes, Nano Letters, 2017, vol. 17, Issue 11, 6893-6899 pp.

Komaba et al., Influence Of Manganese(Ii), Cobalt(Ii), And Nickel(Ii) Additives in Electrolyte on Performance of Graphite Anode for Lithium-Ion Batteries, Electrochimica Acta, Feb. 1, 2002, vol. 47, Issue 8, 1229-1239 pp.

Korthauer et al., Lithium-Ion Batteries: Basics and Applications, Springer Berlin Heidelberg, 2018, 435 pp.

Lin et al., Green Energy Materials Handbook, Retrieved from https://doi.org/10.1201/9780429466281, Jun. 21, 2019, 382 pages.

Lu et al., A Rechargeable Iodine-Carbon Battery That Exploits Ion Intercalation and Iodine Redox Chemistry, Nature Communications 8, Sep. 13, 2017, Article 527 1-10 pp.

McCloskey et al., Solvents' Critical Role in Nonaqueous Lithium-Oxygen Battery Electrochemistry, The Journal of Physical Chemistry Letters, Apr. 27, 2011, vol. 2, Issue 10, 1161-1166 pp.

Meethong et al., Strain Accommodation during Phase Transformations in Olivine-Based Cathodes as a Materials Selection Criterion for High-Power Rechargeable Batteries, Advanced Functional Materials, Mar. 21, 2007, vol. 17, Issue 7, 1115-1123 pp.

Nitta et al., Li-Ion Battery Materials: Present and Future, Materials Today, Jun. 2015, vol. 18, Issue 5, , 252-264 pp.

Peng et al., A Reversible and Higher-Rate Li—O2 Battery, Science, Jul. 19, 2012, vol. 337, Issue 6094, 563-566 pp.

Placke et al., Boosting Aqueous Batteries by Conversion-Intercalation Graphite Cathode Chemistry, Joule 3, May 15, 2019, 1180-1189 pp.

Puthusseri et al., Conversion-type Anode Materials for Alkali-Ion Batteries: State of the Art and Possible Research Directions, ACS Omega, Apr. 26, 2018, vol. 3, Issue 4, 4591-4601 pp.

Shanmukaraj et al., Review-Towards Efficient Energy Storage Materials: Lithium Intercalation/Organic Electrodes to Polymer Electrolytes—A Road Map (Tribute to Michel Armand), Journal of the Electrochemical Society, Mar. 2, 2020, vol. 167, Issue 7, 1-11 pp.

Takechi et al., Stability of Solvents Against Superoxide Radical Species for the Electrolyte of Lithium-Air Battery, ECS Electrochemistry Letters, Jul. 17, 2012, A27-A29 pp.

Takemoto et al., Development of Rechargeable Lithium-Bromine Batteries With Lithium Ion Conducting Solid Electrolyte, Journal of Power Sources, May 1, 2015, vol. 281, 334-340 pp.

Tarascon et al., Issues and Challenges Facing Rechargeable Lithium Batteries, Nature, Nov. 15, 2001, vol. 414, 359-367 pp.

Wang et al., Rechargeable Lithium/Iodine Battery With Superior High-Rate Capability by Using Iodine-Carbon Composite as Cathode, Energy & Environmental Science, 2011, 3947-3950 pp, vol. 4. Issue 10.

Whittingham et al., Lithium Batteries and Cathode Materials, American Chemical Society, Sep. 14, 2004, vol. 104, Issue 10, 4271-4301 pp.

Xu et al., Lithium Metal Anodes for Rechargeable Batteries, Energy Environ. Sci., 2014, Issue 2, 513-537 pp.

Xu et al., Nonaqueous Liquid Electrolytes for Lithium-Based Rechargeable Batteries, Chemical Review, Sep. 16, 2004, 4303-4417 pp, vol. 104, Issue 10.

Yang et al., Aqueous Li-Ion Battery Enabled by Halogen Conversion-Intercalation Chemistry in Graphite, Nature May 8, 2019, vol. 569, 245-263 pp.

Chinese Office Action dated Feb. 2, 2024 from Chinese Application No. 202080018029.6 filed Mar. 20, 2020.

Intellectual Property Office, "Request for the Submission of an Opinion," Dec. 10, 2024, 20 Pages, KR Application No. 10-2023-7000121.

International Searching Authority, "Notification of Transmittal of the International Search Report and the Written Opinion of the International Searching Authority," Patent Cooperation Treaty, Sep. 29, 2020, 6 pages, International Application No. PCT/IB2020/055606.

Japanese Patent Office, "Japanese Notice of Allowance" Jan. 1, 2023, 3 pages, JP Application No. JP2020537780.

Japanese Patent Office, "Japanese Receive Rejection" Dec. 12, 2023, 2 pages, JP Application No. JP2021-549404.

Japanese Patent Office, "Notice of Reasons for Refusal," Dec. 10, 2024, 10 Pages, JP Application No. 2023-501604.

(56)  References Cited

OTHER PUBLICATIONS

Julien et al. "Electrolytes and Separators for Lithium Batteries", Lithium Batteries, Springer International Publishing, 2016. p. 433-437.

Wu et al., LiI Embedded Meso-Micro Porous Carbon Polyhedrons For Lithium Iodine Battery With Superior Lithium Storage Properties, Energy Storage Materials, 2018, vol. 10, 62-68 pp.

German Patent and Trademark Office, "Office Action," Feb. 10, 2025, 08 Pages, DE Application No. 112020002995.6.

German Patent and Trademark Office, "Office Action," Apr. 10, 2025, 08 Pages, DE Application No. 112021003738.2.

Intellectual Property Office, "Notice of Final Rejection," Oct. 2, 2025, 11 Pages, KR Application No. 10-2023-7000121.

Intellectual Property Office of Singapore, " Invitation To Respond To Written Opinion," Feb. 10, 2025, 8 Pages, SG Application No. 11202300214X.

Intellectual Property Office, "Patents Act 1977: Notification Of Grant", Aug. 29, 2023, 2 Pages, GB Application No. 2113517.3.

The State Intellectual Property Office of People's Republic of China, "First Office Action", Dec. 25, 2025, 18 Pages, CN Application No. 202180061301.3.

Intellectual Property Office, "Written Decision on Registration," Feb. 20, 2026, 10 Pages, KR Application No. 10-2023-7000121.

Kim et al., "Reduced Graphene Oxide/LiI Composite Lithium Ion Battery Cathodes", Nano Letters, 2017, vol. 17, Issue 11, pp. 6893-6899.

* cited by examiner

RECHARGEABLE METAL HALIDE BATTERY

BACKGROUND

Rechargeable batteries are used as a power source in a wide range of applications such as, for example, industrial devices, medical devices, electronic devices, electric vehicles, and grid energy storage systems. Battery technology is continually being developed to enable higher energy density and greater efficiency, thereby permitting the use of batteries as power sources for additional applications.

The need for high specific capacities and specific energies has led to the study of various metal-element batteries. Lithium intercalation cathode materials, such as lithium nickel manganese cobalt oxide (NMC), lithium nickel cobalt aluminum oxide (NCA), lithium cobalt oxide (LCO), lithium iron phosphate (LFP), and the like have relatively low energy densities and may be expensive. To identify new and more efficient cathode materials, conversion cathode materials such as sulfur, oxygen, air, and others have been investigated.

Batteries made with lithium-oxygen, lithium-air, and lithium with other gas mixtures containing oxygen have excellent performance due at least in part to the low atomic number, low density, and high reducing capability of elemental lithium. Moreover, a lithium-oxygen battery could potentially have a theoretical specific energy three to five times greater than conventional lithium ion batteries.

Lithium metal has a high energy storage capacity and has been utilized as a primary battery anode material. In some cases lithium metal anodes can form dendrites, which can cause short circuits during cell operation. It has also proven difficult to find reasonably inexpensive cathode materials that can accommodate the large amount of lithium ions and electrons extracted from a lithium metal anode.

SUMMARY

Some batteries including sulfur, oxygen, air, or other active cathode materials have poor cyclability, low power density, or both. For example, such batteries may be relatively unstable and/or undergo parasitic reactions which may result in electrochemically irreversible carbonate byproducts that reduce the cyclability and/or power density of the battery, e.g., due to electrolyte decomposition or carbon surface oxidation.

In general, the present disclosure is directed to a battery with an electrolyte including an oxidizing gas, a metal halide, and a solvent including a heterocyclic compound. In various embodiments, the battery of the present disclosure has one or more of a relatively fast charging rate, high energy efficiency, high power density, and good cyclability. Additionally, in some embodiments, the electrolyte described herein may be more cost effective and potentially less hazardous than some other battery electrolytes. The electrolyte can provide high power density in metal-based batteries by forming small and dense nuclei that also have a relatively consistent size, which can powerfully and naturally suppress undesirable dendrite growth on the anode. Additionally, the electrolyte includes no heavy metals such as, for example, cobalt or nickel, and as such is expected to reduce overall battery manufacturing costs.

In one aspect, the present disclosure is directed to a battery, including:

an anode;
an electrolyte including:
    an oxidizing gas;
    an active cathode material including a metal halide; and
    a solvent including a heterocyclic compound; and
a current collector contacting the active cathode material.

In another aspect, the present disclosure is directed to a battery, including:

(a) an anode that takes up metal ions from an electrolyte during charging, and releases the ions to the electrolyte during discharging, the electrolyte including:
    (i) a solvent including a heterocyclic compound, and
    (ii) a dissolved halide, wherein the halide functions as a cathode for the battery;
(b) a solid electrolyte interphase (SEI) layer contacting the anode, the SEI layer including an oxide of the metal; and
(c) a current collector including an electrically conductive porous material, wherein the current collector contacts the dissolved halide.

In another aspect, the present disclosure is directed to a method of forming a battery, including:
    dissolving a metal halide in a solvent including a heterocyclic compound to form a solution;
    soaking a separator with the solution;
    stacking an anode, the separator soaked with the solution, and a current collector, wherein the stacking includes placing the separator soaked with the solution between the anode and the current collector; and
    introducing an oxidizing gas to the stacked anode, separator soaked with the solution, and current collector to form the battery, wherein the battery includes:
    an anode,
    an electrolyte, including:
        an oxidizing gas;
        an active cathode material including a metal halide;
        and
        a solvent including a heterocyclic compound; and
    a current collector contacting the active cathode material.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

Like symbols in the figures indicate like elements.

DETAILED DESCRIPTION

Figure 1:
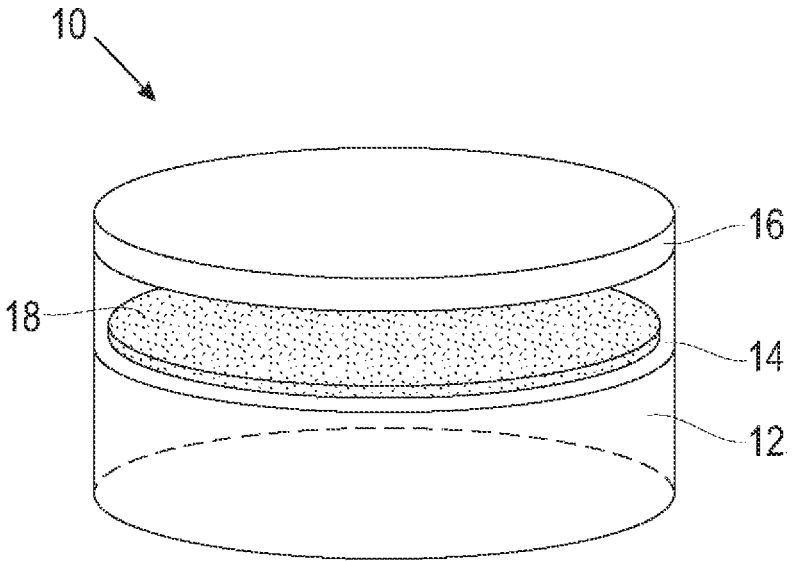
FIG. 1 is a conceptual diagram illustrating an example battery including an anode, an electrolyte, a current collector, and an optional separator.

FIG. 1 is a conceptual diagram illustrating an example battery 10 including an anode 12, an electrolyte 14, a current collector 16, and an optional separator 18. The battery 10 operates via reduction-oxidation (redox) reactions, and utilizes different oxidation states and redox reactions of one or more components or elements for charge and discharge.

The anode 12 may be made from any metal, and suitable examples include, but are not limited to, lithium, magnesium, sodium, and mixtures and combinations thereof. In some examples, the anode 12 consists essentially of elemental lithium, magnesium, or sodium, or lithium, or magnesium, or sodium alloyed with one or more additional elements. In some embodiments, the anode 12 consists of elemental lithium, magnesium, sodium, or lithium.

The anode 12 may take up metal ions from the electrolyte 14 during charging, and release the metal ions to electrolyte 14 during discharging. In some embodiments, the anode 12 may be an intercalation host material capable of taking up metal ions. In some examples, a solid electrolyte interphase (SEI) layer may be in contact with the anode 12. For example, the SEI layer may include an oxide of a metal from the electrolyte 14.

The electrolyte 14, which may be aqueous or non-aqueous, includes a solvent including a heterocyclic compound, a metal halide, and an oxidizing gas. In this application the term heterocyclic compound refers to an aromatic or non-aromatic cyclic compound having as ring members atoms of at least two different elements. A cyclic compound (ring compound) as used in the present application refers to a compound in which one or more series of atoms in the compound is connected to form a ring. In various embodiments, suitable cyclic compounds for the electrolyte 14 include 5-membered rings such as pyrrolidines, oxolanes, thiolanes, pyrroles, furans and thiophenes; 6-membered rings such as piperadines, oxanes, thianes, pyridines, pyrans and thiopyrans; and 7-membered rings such as azepanes, oxepanes, thiepanes, azepines, oxepines, and thiepenes. Examples of suitable heterocyclic compounds include, but are not limited to, tetrahydrofuran, tetrahydropyran, tetrahydrothiophene, oxathiolane, succinimide, oxazolidone, γ-butyrolactone, γ-caprolactone, ε-caprolactone, γ-valerolactone, pyrrolidine, imidazolidine, sulfolane, thiane and mixtures and combinations thereof. In some embodiments, suitable heterocyclic compounds include, but are not limited to, cyclic ethers, cyclic esters, and mixtures and combinations thereof.

In some examples, the electrolyte 14 may include one or more additional solvents. In some embodiments, the one or more additional solvents may be chosen from non-aqueous, organic solvents such as an ether, a glyme, a carbonate, a nitrile, an amide, an amine, an organosulfur solvent, an organophosphorus solvent, an organosilicon solvent, a fluorinated solvent, adiponitrile (ADN), propylene carbonate (PC), dimethoxyethane (DME), and mixtures and combinations thereof. In some examples, the electrolyte 14 includes equal parts of the solvent including the heterocyclic compound and the one or more additional solvents. In some examples, the one or more additional solvents in the electrolyte 14 may be selected to further improve the electrochemical performance of battery 10, such as, for example, by enhancing rechargeability, cyclability, or the like.

The electrolyte 14 includes an oxidizing gas. In some examples, electrolyte 14 may be in the presence of an oxidizing gas, and the phrase "includes an oxidizing gas" is intended to include such a configuration. In some examples, the oxidizing gas may be dissolved in the solvent including the heterocyclic compound of electrolyte 14. In some examples, which are not intended to be limiting, the oxidizing gas includes at least one of oxygen, air, nitric oxide, or nitrogen dioxide. The oxidizing gas helps induce the redox reactions of battery 10 as described above, and helps achieve highly reversible redox reactions, which may contribute to enhanced electrochemical performance of battery 10. The oxidizing gas may help induce such redox reactions, but is not consumed or evolved during use of battery 10 (e.g., the oxidizing gas does not participate in the redox reactions of battery 10). In some examples, an electrolyte including a metal halide and a solvent including a heterocyclic compounds, but not including an oxidizing gas, may exhibit little or no rechargeability.

The electrolyte 14 also includes a metal halide (e.g., MX, where M is a metal element and X is a halogen element). In some examples, the metal halide includes an electrolyte salt that dissociates into a respective halide ion and a respective metal ion. For example, the metal halide may dissolve in the solvent including the heterocyclic compound, and dissociate into the respective metal and halide ions. In some examples, the halide ion may include an ion of at least one of I, Br, Cl, or F (e.g., X may be I, Br, Cl, or F), and the metal ion may include an ion of at least one of Li, Mg, or Na (e.g., M may be Li, Mg, or Na). In other examples, the metal halide may include elements other than I, Br, Cl, F, Li, Mg, and/or Na. The metal halide may provide the electrolyte 14 with ionic conductivity.

In some embodiments, the electrolyte 14 includes an optional additional salt that dissociates into a respective metal ion and a respective counter anion. In some examples, which are not intended to be limiting, the metal ion includes at least one of Li, Mg, and Na, and the counter anion includes one or more of nitrate ($NO_3^-$), hexafluorophosphate ($PF_6^-$), tetrafluoroborate ($BF_4^-$), bisoxalato borate (BOB), difluorooxalato borate ($DFOB^-$), trifluoromethanesulfonate ($TF^-$), and trifluorosulfonylimide ($TFSI^-$).

Additionally, or alternatively, the metal halide of electrolyte 14 may function as an active cathode material. For example, the metal halide may receive, store, and release the metal ions during charging and discharging of battery 10. In this way, the battery 10 may not include a dedicated cathode material. Instead, battery 10 may include the active cathode material of the metal halide of electrolyte 14 and a current collector 16. In turn, the battery 10 may be cheaper to make, more lightweight, have a higher power density, or combinations thereof. In some cases, the high power density of the electrolyte including the metal halide that functions as an active cathode material may enable the battery 10 to be charged significantly faster than some other batteries that do not include the electrolyte described herein. In some examples, an electrolyte comprising a solvent including a heterocyclic compound and an oxidizing gas, but not including a metal halide, may have reduced electrochemical performance (e.g., reversibility, rechargeability, and/or cyclability), produce irreversible carbonate byproducts, have reduced power density, or combinations thereof in comparison to electrolyte 14.

The current collector 16 may include a material of suitable electrical conductivity that collects electrons generated by a redox reaction during discharge of battery 10 and provides a conductive path to an external electrical circuit to which battery 10 is connected. Similarly, during recharge of battery 10, the current collector 16 provides an electrical pathway between an external voltage source and electrolyte 14 to supply voltage for another redox reaction to charge battery 10. In some examples, current collector 16 may include electrically conductive powders such as metal and/or carbon powders, woven or non-woven metal fibers, metal foam, woven or non-woven carbon fibers, or the like. Additionally, or alternatively, currently collector 16 may include stainless-steel mesh, aluminum (Al) mesh, nickel (Ni) foam, and/or carbon paper. For example, in one embodiment, the current collector 16 may include a stainless-steel mesh with carbon nanoparticles deposited thereon. As yet another example, current collector may be a porous material that is electrically conductive.

In other examples, the battery 10 may include a dedicated cathode material in addition to the metal halide functioning as the active cathode material and current collector 16. For example, battery 10 may include a cathode that provides a conductive path to an external electrical circuit to which battery 10 is connected. In some cases, the battery 10 may include a cathode that may be used in a Li-ion battery. For example, the cathode may include at least one of lithium cobalt oxide (LCO, e.g., $LiCoO_2$), nickel cobalt aluminum (NCA, e.g., $LiNi_xCo_yAl_zO_2$, $LiNi_{0.8}Co_{0.15}Al_{0.05}O_2$), lithium ion manganese oxide (LMO, e.g., $LiMn_2O_4$), lithium manganese cobalt oxide (NMC, e.g., $LiNiMnCoO_2$), nickel cobalt manganese (NCM, e.g., $LiNi_xCo_yMn_zO_2$, $LiNi_{0.33}Co_{0.33}Mn_{0.33}O_2$) or lithium iron phosphate (LFP, e.g., $LiFePO_4$). In other examples, battery 10 may include a different or an additional cathode material.

In some examples, the battery 10 includes an optional separator 18. The separator 18 may force electrons through an external electrical circuit to which battery 10 is connected such that the electrons do not travel through battery 10 (e.g., through electrolyte 14 of battery 10), while still enabling the metal ions to flow through battery 10 during charge and discharge. In some examples, separator 18 may be soaked with electrolyte 14, within electrolyte 14, surrounded by electrolyte 14, or the like. The separator 18 may include an electrically non-conductive material to prevent movement of electrons through battery 10 such that the electrons move through the external circuit instead. For example, separator 18 may include glass, non-woven fibers, polymer films, rubber, or the like.

In some examples, the battery 10 has a closed or substantially closed volume. For example, anode 12, electrolyte 14, current collector 16, and separator 18 may be within a closed or substantially closed cell or other enclosure. In this way, the oxidizing gas of electrolyte 14 remains within the battery 10 such that the battery 10 has a relatively fast charging rate, high energy efficiency, high power density, high reversibility, high cyclability, or combinations thereof, as described herein.

The battery 10 may be capable of undergoing many charging and discharging cycles (e.g., exhibits good rechargeability), even at relatively high charging densities. In some examples, battery 10 is capable of completing at least 100 cycles of charging and discharging at a current density of greater than or equal to about 1 $mA/cm^2$, about 5 $mA/cm^2$, about 10 $mA/cm^2$, or about 20 $mA/cm^2$. As one example, battery 10 may be capable of completing at least 1000 cycles of charging and discharging at a current density of greater than or equal to about 1 $mA/cm^2$, about 5 $mA/cm^2$, about 10 $mA/cm^2$, or about 20 $mA/cm^2$.

Additionally, or alternatively, the battery 10 may exhibit a relatively high energy efficiency. For example, battery 10 may exhibit an energy efficiency of greater than or equal to 90% at a current density of greater than or equal to about 1 $mA/cm^2$, about 5 $mA/cm^2$, about 10 $mA/cm^2$, or about 20 $mA/cm^2$. In some examples, battery 10 may exhibit an energy efficiency of greater than or equal to 99% at a current density of greater than or equal to about 1 $mA/cm^2$, about 5 $mA/cm^2$, about 10 $mA/cm^2$, or about 20 $mA/cm^2$.

Figure 2:
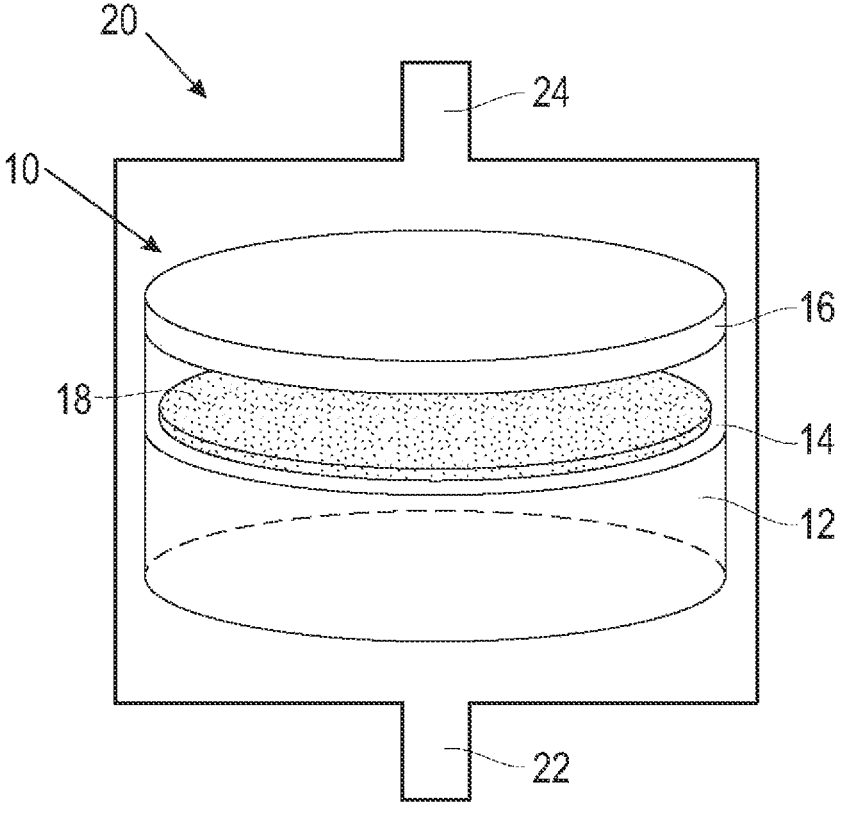
FIG. 2 is a conceptual diagram illustrating the example battery of FIG. 1 within an enclosed cell.

FIG. 2 is a conceptual diagram illustrating the example battery 10 of FIG. 1 within an enclosed cell system 20. The enclosed cell system 20 may include a cell that houses battery 10 during operation of battery 10, a cell used to fabricate battery 10, or both. For example, enclosed cell system 20 may include a cell available from Swagelok of Solon, OH, under the trade designation SWAGELOK, and may be used to fabricate battery 10. In some examples, enclosed cell system 20 may include an inlet tube 22 and/or an outlet tube 24. Inlet tube 22 and outlet tube 24 may be used to introduce and remove air or other gases, such as the oxidizing gas of electrolyte 14, into and out of the enclosed cell.

Figure 3:
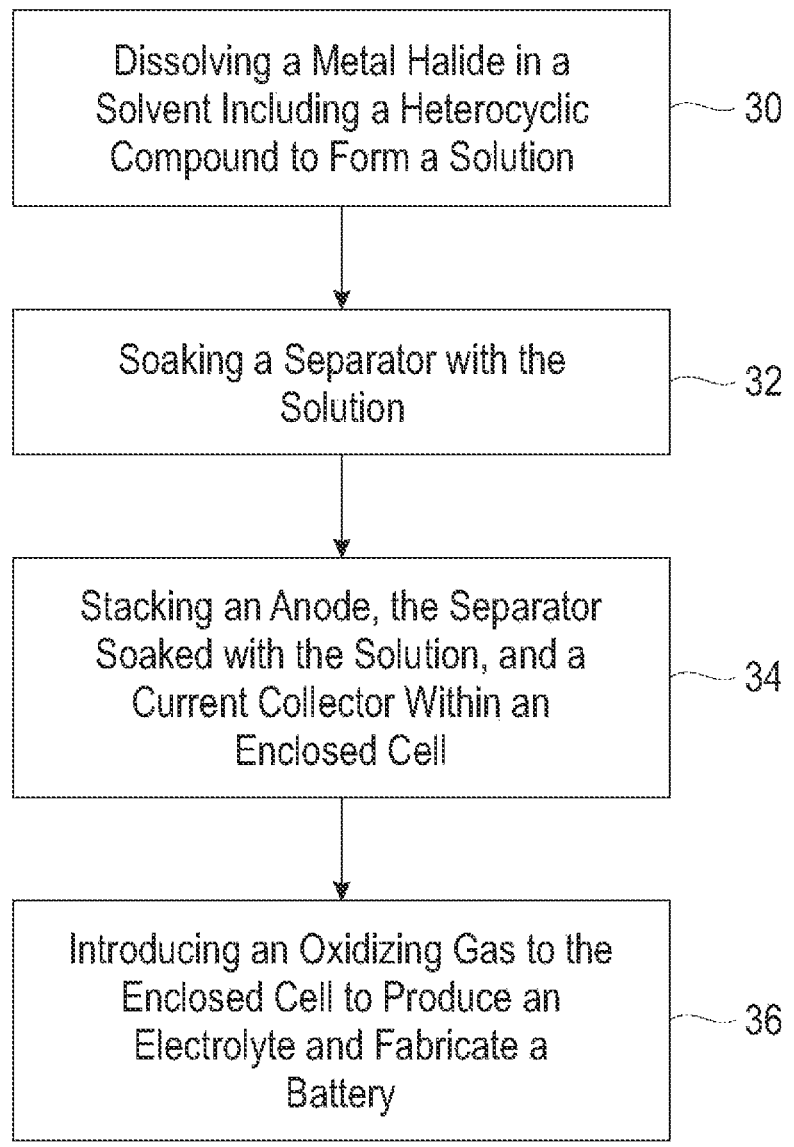
FIG. 3 is a flow diagram illustrating an example technique for fabricating a battery.

FIG. 3 is a flow diagram illustrating an example technique for fabricating battery 10 of FIG. 1. The technique of FIG. 3 will be described with respect to enclosed cell system 20 of FIG. 2. In other examples, however, the technique of FIG. 3 may be used with a system other than enclosed cell system 20 of FIG. 2. Moreover, although the technique of FIG. 3 is described with respect to an enclosed cell system, in some examples, FIG. 3 may be used with a cell that is not fully enclosed (e.g., at least partially open).

The technique of FIG. 3 includes dissolving a metal halide in a solvent including a heterocyclic compound to form a solution (30). To dissolve the metal halide in the solvent including the heterocyclic compound, the metal halide may be added to the solvent including the heterocyclic compound and lightly stirred, such as lightly stirred overnight. In some examples, the solution of the metal halide dissolved in the solvent including the heterocyclic compound may have a concentration of between about 0.1 M and about 20 M, about 0.5 M and about 10 M, or about 1 M and about 5 M.

In some examples, the metal halide may be dried prior to being dissolved in the solvent including the heterocyclic compound. The drying temperature and/or drying time may be chosen based on the metal halide to be used in electrolyte 14, and in some non-limiting examples the metal halide may be dried on a hotplate in an argon filled glovebox at about 120° C. for greater than 12 hours.

Additionally, or alternatively to drying the metal halide, in some examples, the solvent including the heterocyclic compound may also be dried prior to dissolving the metal halide therein. For example, the solvent including the heterocyclic compound may be stored overnight with a molecular sieve.

The technique of FIG. 3 further includes soaking the optional separator 18 with the solution (32). Soaking separator 18 with the solution may include dipping separator 18 into the solution, applying the solution to separator 18, or any other method of soaking separator 18 with the solution. In some examples, soaking separator 18 with the solution may include soaking separator 18 with the solution in a range of about 1 µL/cm² to about 500 µL/cm², about 10 µL/cm² to about 250 µL/cm², or about 50 µL/cm² to about 100 µL/cm².

The technique of FIG. 3 additionally includes stacking anode 12, optional separator 18 soaked with the solution, and current collector 16 within the enclosed cell system 20 (34), e.g., as shown in FIG. 2. In some examples, the stacking may include placing separator 18 between anode 12 and current collector 16. In some examples, one or more of anode 12, separator 18 soaked with the solution, or current collector 16 may be stacked prior to soaking separator 18 with the solution. For example, the separator 18 may be stacked on anode 12 and then soaked with the solution. In some cases, the enclosed cell system 20 may be at least partially open during the stacking procedure, and after anode 12, separator 18 soaked with the solution, and current collector 16 have been stacked, the enclosed cell system 20 may be closed or substantially closed to form a closed or substantially closed volume around anode 12, separator 18 soaked with the solution, and current collector 16.

In other examples, battery 10 may not include separator 18. In such examples, electrolyte 14 may be introduced to battery 10 in a different manner. For example, battery 10 may include electrolyte 14 between anode 12 and current collector 16 without separator 18. Electrolyte 14 may be introduced into battery 10 in any applicable manner such that electrolyte 14 can function as described herein. In this way, the technique of FIG. 3 may include stacking anode 12 and current collector 16 within enclosed cell system 20.

The technique of FIG. 3 also includes introducing an oxidizing gas to enclosed cell system 20 to produce electrolyte 14 and fabricate battery 10 (36). In some examples, introducing the oxidizing gas to enclosed cell system 20 to produce electrolyte 14 and fabricate battery 10 includes introducing the oxidizing gas to the enclosed cell 20 via inlet tube 24. In some examples, enclosed cell system 20 may include or be in the presence of an inert gas, such as argon, prior to introducing the oxidizing gas to enclosed cell system 20. In some such examples, introduction of the oxidizing gas may purge and completely replace the inert gas within enclosed cell system 20 with the oxidizing gas. For example, the oxidizing gas may be introduced to the enclosed cell 20 via inlet tube 24, and the inert gas may be purged through outlet tube 26. In some examples, the concentration of the oxidizing gas in enclosed cell system 20 may be between about 5 weight (wt) % and about 100 wt %, about 50 wt % and about 100 wt %, or about 80 wt % and about 100 wt % of the total amount of gases within enclosed cell system 20, such as of the total amount of the oxidizing gas and the inert gas within enclosed cell system 20.

The present disclosure will now be described with respect to the following non-limiting examples.

EXAMPLES

Example 1: Preparation of the Electrolyte and Cell Assembly

Lithium iodide (LiI) was placed in a vial and dried on a hot plate inside an argon filled glovebox (<0.1 ppm $H_2O$, $O_2$) at 120° C. for 1 hour. γ-Butyrolactone (GBL), ε-Caprolactone (ECL), and Tetrahydrofuran (THF) were selected as suitable examples of heterocyclic compounds for the battery cell electrolyte, and were purified with a molecular sieve (3 Å) overnight. 1M of dried LiI powder was added, dissolved into a solution including the selected heterocyclic compound, and lightly stirred overnight.

1M LiI in the heterocyclic compound electrolyte solution was used to soak the separator positioned on top of the lithium metal anode, and a carbon coated current collector was placed on the other side of the separator. Thus, the separator wetted by the electrolyte solution was placed between the anode and the cathode and was in contact with both the anode and the cathode. The cell assembly was performed in an argon-filled glovebox.

All the cell components were placed within a cell available under the trade designation SWAGELOK from Swagelok, Inc., Solon, OH, which included both inlet and outlet tubing for oxygen flow. Oxygen was then introduced through the inlet tubing, purged and completely replaced the argon gas inside the cell.

As shown below, cells using electrolytes including GBL showed higher energy efficiency, whereas the use of ECL provided a longer cycle life. A mixture of these solvents would likely provide the strength of each solvent and become an ideal electrolyte system for the rechargeable metal halide battery.

For comparative examples, 1M LiI-GBL in an oxygen-free environment and 1M LiI in tetraethylene glycol dimethyl ether (TEGDME) in an oxygen-containing environment were tested with the same cell configuration.

Figure 4A:
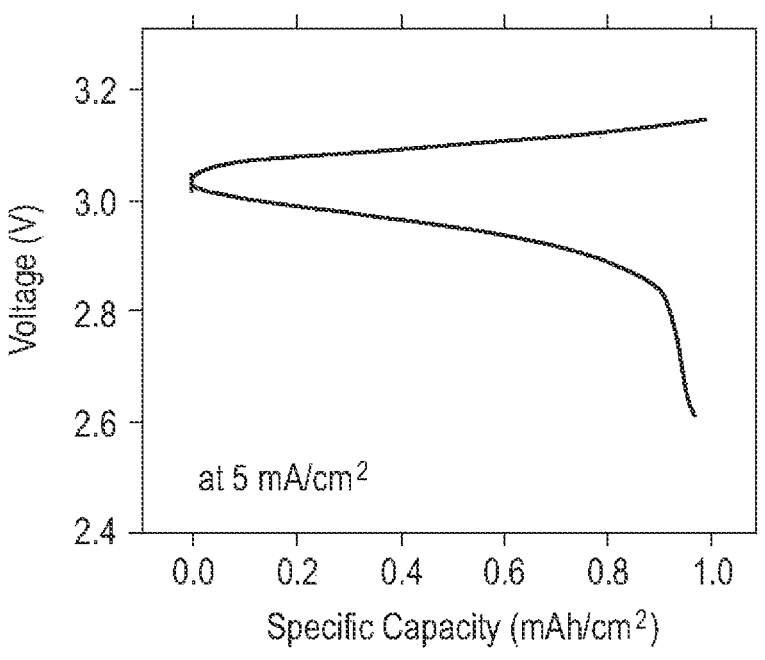
FIGS. 4A-4B are plots of the discharge and charge galvanostatic cycling behavior of the 1st cycles and areal specific discharge capacity with respect to the cycle number of the cells using 1M LiI-GBL in the presence of oxygen as described in Example 2. The cells were operated at a current density of 5 mA/cm$^2$.

Example 2: Rechargeable Lithium Iodide Battery with GBL Electrolyte and Oxygen FIG. 4A shows 1st discharge and charge cycle of the cell of Example 1 incorporating 1M LiI-GBL electrolyte in the presence of ultrahigh purity oxygen at current density of 5 mA/cm². LiI was chosen as an example of the metal halide salt, GBL was selected as an example of the heterocyclic compound, and oxygen was chosen as an example of the oxidizing gas.

Figure 4B:
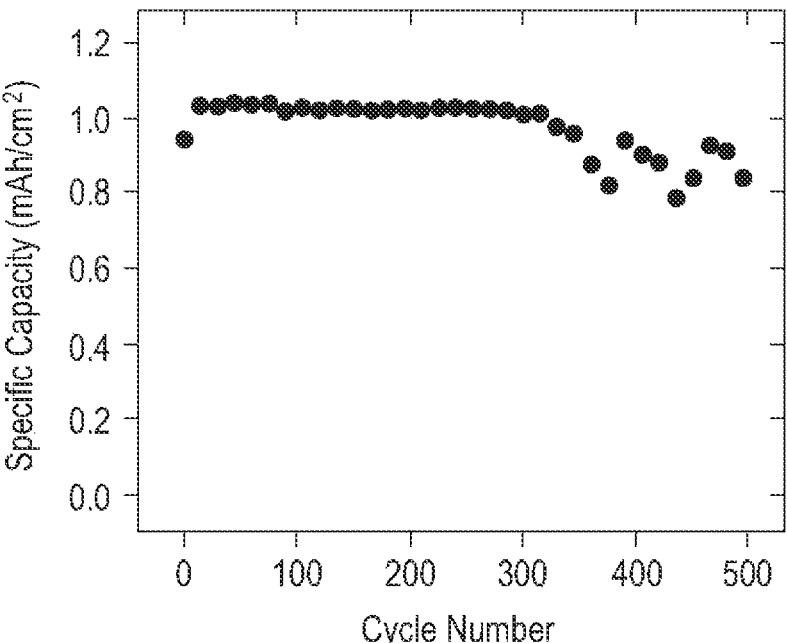

The cells maintained excellent energy efficiency (>90%) and produced high output power (>10 mW/cm²) over 500 cycles as shown in FIG. 4B. The specific capacity was normalized by the area of the electrode.

Figure 5A:
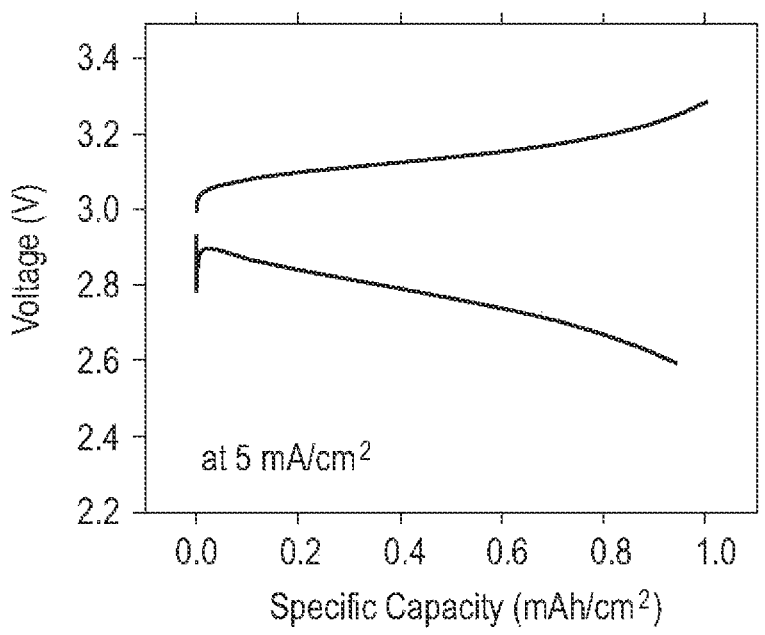
FIGS. 5A-5B are plots of the discharge and charge galvanostatic cycling behavior of the 1st cycles and areal specific discharge capacity with respect to the cycle number of the cells using 1M LiI-ECL in the presence of oxygen as described in Example 3. The cells were operated at a current density of 5 mA/cm².

Example 3: Rechargeable Lithium Iodide Battery with ECL Electrolyte and Oxygen FIG. 5A shows 1st discharge and charge cycle of a cell of Example 1 incorporating 1M LiI-ECL electrolyte in the presence of ultrahigh purity oxygen at current density of 5 mA/cm². LiI was chosen as an example of the metal halide salt, ECL was the heterocyclic compound, and oxygen was the oxidizing gas.

Figure 5B:
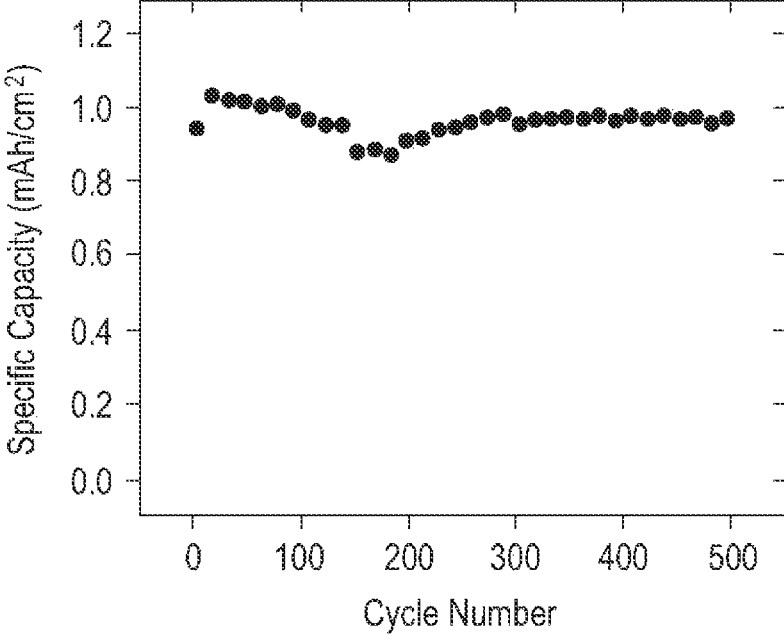

The cells maintained high output power (>10 mW/cm²) over 500 cycles as shown in FIG. 5B. The specific capacity was normalized by the area of the electrode.

Figure 6A:
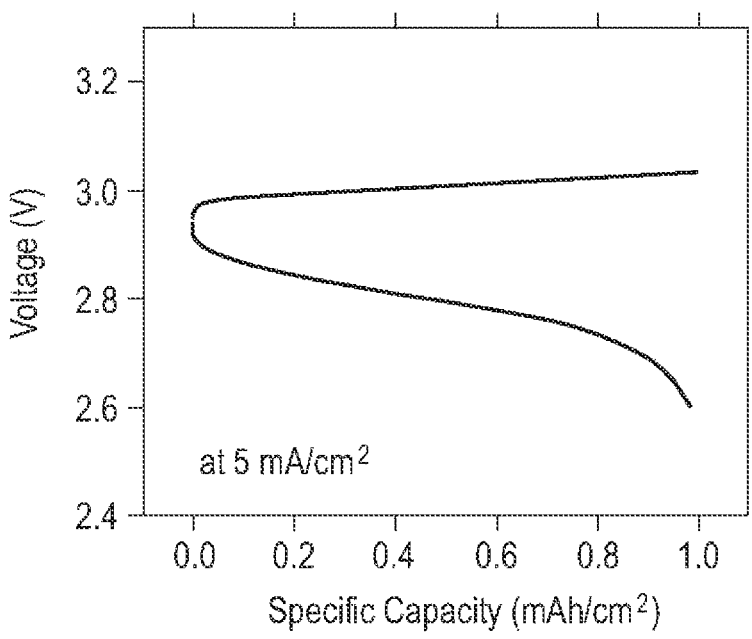
FIGS. 6A-6B are plots of the discharge and charge galvanostatic cycling behavior of the 1st cycles and areal specific discharge capacity with respect to the cycle number of the cells using 1M LiI-THF electrolyte in the presence of oxygen as described in Example 4. The cells were operated at a current density of 5 mA/cm².

Example 4: Rechargeable Lithium Iodide Battery with THF Electrolyte and Oxygen FIG. 6A shows 1st discharge and charge cycle of a cell of Example 1 incorporating 1M LiI-THF electrolyte in the presence of ultrahigh purity oxygen at current density of 5 mA/cm². LiI was chosen as the metal halide salt, THF was chosen as an example of the heterocyclic compound, and oxygen was selected as the oxidizing gas.

Figure 6B:
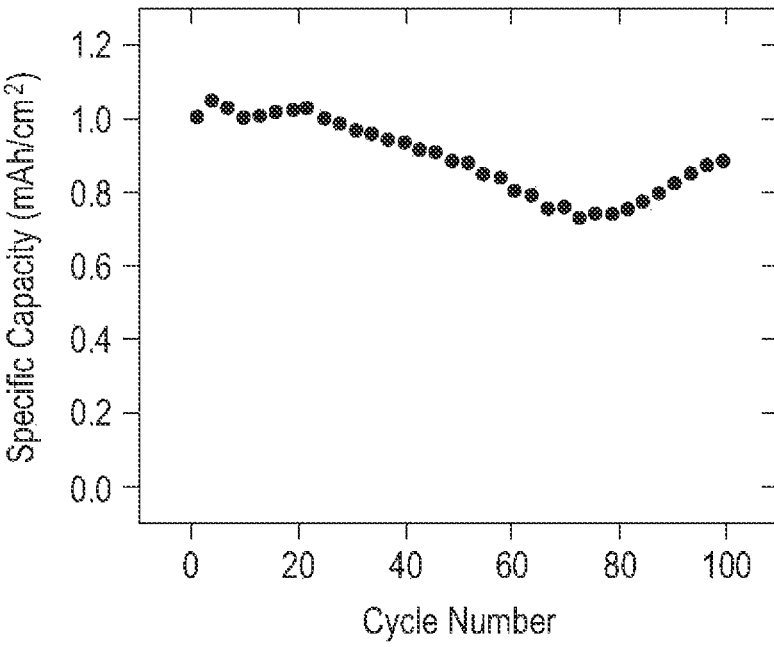

The cells maintained high output power (>10 mW/cm²) for over 100 cycles as shown in FIG. 6B. The specific capacity was normalized by the area of the electrode.

Figure 7:
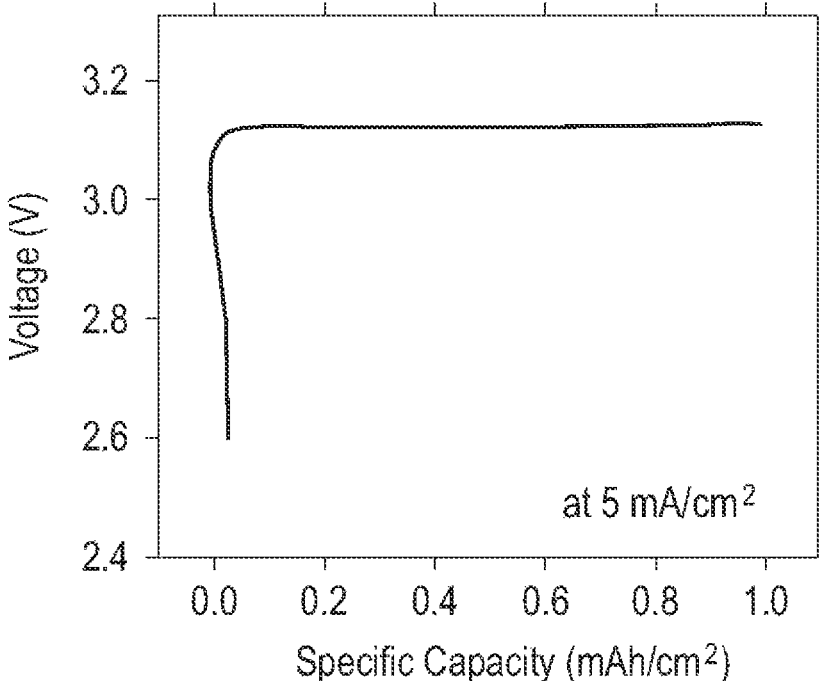
FIG. 7 is a plot of the discharge and charge galvanostatic cycling behavior of the $1^{st}$ cycle using 1 M LiI-GBL in the absence of oxygen in the cell of Comparative Example 1. The cells were operated at a current density of 5 mA/cm².

Comparative Example 1: Lithium Iodide Battery with GBL Electrolyte without Oxygen FIG. 7 shows 1st discharge and charge cycle of a cell of Example 1 incorporating 1M LiI-GBL electrolyte in the absence of oxygen at a current density of 5 mA/cm². The cell provides negligible discharge capacity in the 1st cycle with the same electrolyte solution as utilized in the cell of Example 2. The coulombic efficiency was less than 10% in the 1st cycle and did not improve at all in the following cycles. The specific capacity was normalized by the area of the electrode.

Figure 8:
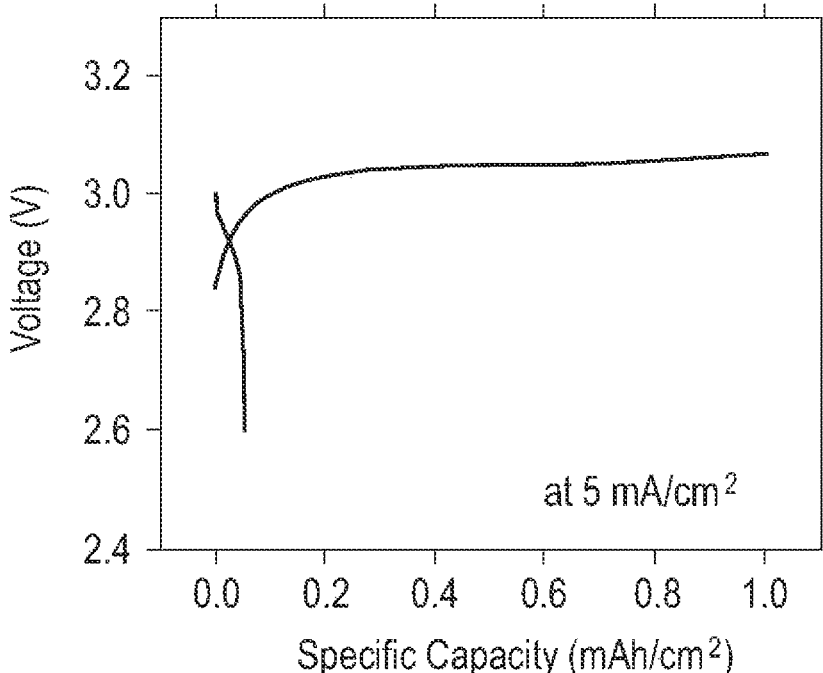
FIG. 8 is a plot of the discharge and charge galvanostatic cycling behavior of the 50th cycle using 1 M LiI-TEGDME electrolyte in the presence of oxygen in the cell of Comparative Example 2. The cells were operated at a current density of 5 mA/cm².

Comparative Example 2: Lithium Iodide Battery with TEGDME Electrolyte and Oxygen FIG. 8 shows the 50th discharge and charge cycle of a cell of Example 1 incorporating 1M LiI-TEGDME electrolyte in the presence of ultrahigh purity oxygen at a current density of 5 mA/cm². The cell provides negligible discharge capacity in the 50th cycle under an oxygen environment. Although the coulombic efficiency of the cell was greater than 90% in the 1st cycle, it dropped significantly starting with the next cycle, and eventually dropped to less than 10% in the 50th cycle. The specific capacity was normalized by the area of the electrode. It is noteworthy from the result of this example that battery performance drops when the cyclic compound in the electrolyte does not include an ether group.

Various embodiments have been described. These and other embodiments are within the scope of the following claims.

What is claimed is:

1. A battery, comprising:
   (a) an anode;
   (b) an electrolyte, comprising:
      (i) a solvent comprising a heterocyclic compound, and
      (ii) a metal halide dissolved in the electrolyte, wherein the dissolved metal halide functions as an active cathode material for the battery; and
   (c) a current collector contacting the metal halide dissolved in the electrolyte, wherein the battery does not include a dedicated cathode material in addition to the metal halide dissolved in the electrolyte that functions as the active cathode material.

2. The battery of claim 1, wherein the battery is capable of at least 100 cycles of charging and discharging.

3. The battery of claim 1, further comprising a separator between the anode and the current collector.

4. The battery of claim 1, wherein the electrolyte is non-aqueous.

5. The battery of claim 1, wherein the halide of the metal halide is selected from the group consisting of I—, Br—, Cl—, F—, and mixtures and combinations thereof.

6. The battery of claim 1, wherein the heterocyclic compound is selected from the group consisting of tetrahydrofuran, tetrahydropyran, tetrahydrothiophene, oxathiolane, succinimide, oxazolidone, γ-butyrolactone, γ-caprolactone, ε-caprolactone, γ-valerolactone, pyrrolidine, imidazolidine, sulfolane, thiane, and mixtures and combinations thereof.

7. The battery of claim 1, wherein the electrolyte further comprises an additional organic solvent selected from the group consisting of ethers, glymes, carbonates, nitriles, amides, amines, organosulfur solvents, organophosphorus solvents, organosilicon solvents, fluorinated solvents, and mixtures and combinations thereof.

8. The battery of claim 1, wherein the anode comprises a metal selected from the group consisting of Li, Na, Mg, and mixtures and combinations thereof.

9. The battery of claim 1, wherein the anode comprises an intercalation host material capable of taking up metal ions.

10. The battery of claim 1, further comprising a separator between the anode and the current collector.

11. The battery of claim 1, wherein the metal halide comprises an electrolyte salt that dissociates into a respective halide ion and a respective metal ion in the solvent, and wherein the halide ion comprises an ion of at least one of I, Br, Cl, and F, and the metal ion comprises an ion of at least one of Li, Mg, and Na.

12. The battery of claim 1, wherein the electrolyte further includes, in addition to the active metal cathode comprising the metal halide, a salt that dissociates into a respective metal ion and a respective counter anion, wherein the metal ion is selected from the group consisting of Li, Mg, and Na, and mixtures and combinations thereof, and the anion is selected from the group consisting of nitrate ($NO_3^-$), hexafluorophosphate ($PF_6^-$), tetrafluoroborate ($BF_4^-$), bisoxalato borate ($BOB^-$), and difluorooxalato borate ($DFOB^-$), trifluoromethanesulfonate ($TF^-$), trifluorosulfonylimide ($TFSI^-$), and mixtures and combinations thereof.

* * * * *